May 26, 1931. J. KRUTTSCHNITT 1,806,878
DOUGH COOKING MACHINE
Filed May 27, 1930

INVENTOR.
John Kruttschnitt

Patented May 26, 1931

1,806,878

UNITED STATES PATENT OFFICE

JOHN KRUTTSCHNITT, OF SAN MATEO, CALIFORNIA

DOUGH COOKING MACHINE

Application filed May 27, 1930. Serial No. 456,048.

My invention relates to that class of cookers in which dough, in desired form, is supplied to a body of liquefied fat maintained at frying temperature.

My invention consists, briefly stated, in means for feeding the dough as a continuous strip to the frying liquid; means for imparting continuous travel to said strip; and means for turning the strip half over at a predetermined point in its travel to insure the cooking of both sides.

In the preferred form of the machine, the course of the strip is first forward, and then in the reverse direction backward to its delivery.

The machine, more in detail, will be hereinafter fully disclosed in connection with the accompanying drawings, in which I have illustrated the preferred form, though it is to be understood that changes may be made without departing from the spirit of the invention as defined by the claims hereunto appended.

The object of my invention is to provide a simple, compact and efficient apparatus for cooking dough in strip-like form, in continuous operation.

Figure 1:
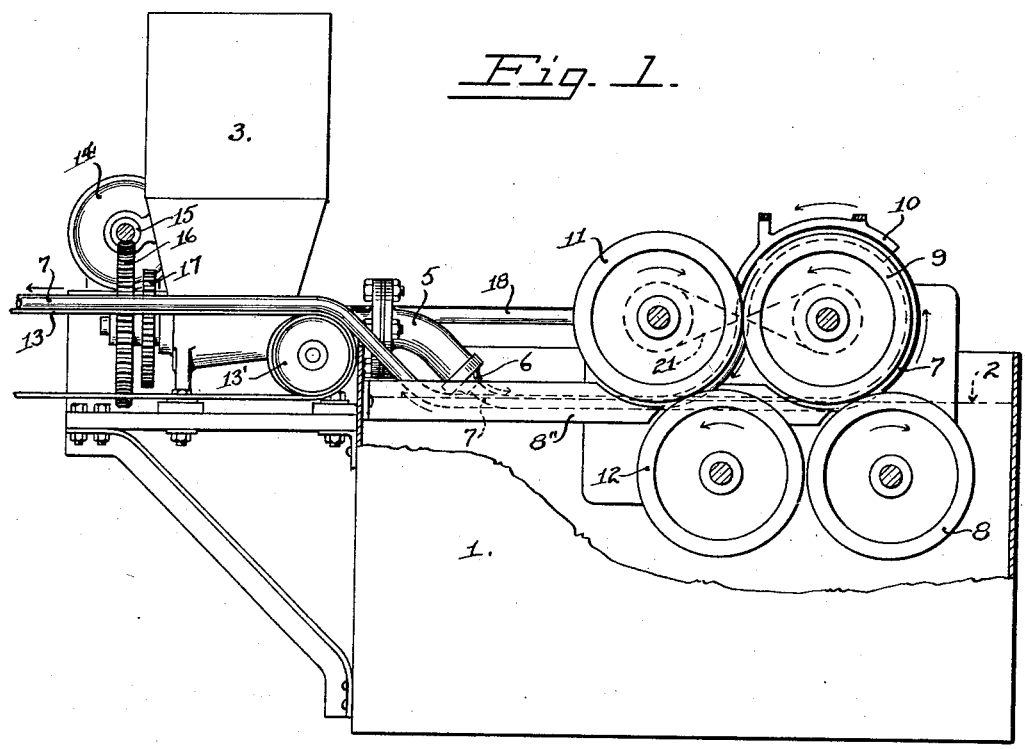

In the drawings, Fig. 1 is a side elevation, partly in section of my machine.

Figure 2:
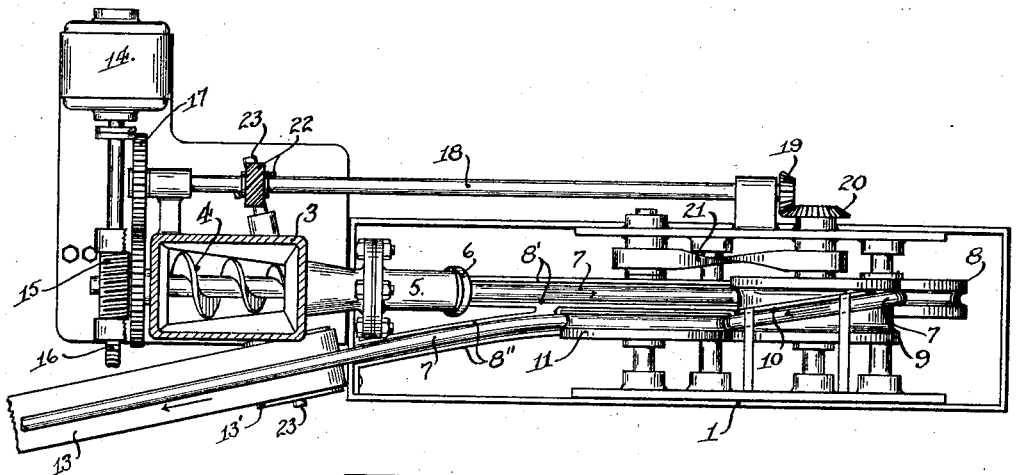

Fig. 2 is a plan, partly in section, of the same.

1 is a tank in which is a quantity of fat, kept liquid by any suitable heating means, unnecessary herein to show. The level of the liquid is indicated at 2, and is kept substantially constant by controlling means, also unnecessary to show.

3 is a hopper for containing the dough, said hopper having in its throat a screw 4 adapted to feed the dough through a spout member 5 which has a tip 6 of a form to reduce the issuing dough to a strip of any desired cross section, angular or round, though I have at present in mind a round string-like strip as the preferred form. This strip, issuing from the stout tip 6 and designated by the numeral 7, is deposited upon the surface of the body of fat 2, upon which it floatingly advances, partially submerged. Its forward advance is directed by side guides 8' fixed in the tank, from the control of which it emerges near the end of the tank and there enters between a pair of rolls 8 and 9. The lower roll 8 is merely a directing member driven by friction from the upper roll 9. The roll 9 is the lifting, turning, and direction-reversing member. It is peripherally grooved and the lower roll 8 is so positioned that the dough strip 7 enters at one side of the groove of said roll 9 and is carried upwardly therein to a point where it meets a fixed inclined switch rail 10, by which it is shifted over to the other side of the groove of said roll 9, in which side it is carried down between the roll 9 and a roll 11. The latter roll is the upper one of a pair, the lower member being the roll 12. Between this pair 11 and 12 the dough strip passes and is redeposited upon the surface of the fat upon which it floatingly proceeds back between guides 8'' to the first end of the tank and is there lifted to a conveyer belt 13, traveling upon terminal sheaves, one of which is shown at 13', and by said belt is carried to its destination, say, a cutting instrumentality, not shown, by which it is severed into desired lengths.

The reason for laterally shifting the dough strip as it passes around the reversing roll 9 is to avoid interference between its forward and its return runs, which thus travel side by side without touching each other.

By means of the roll 9, the dough strip 7, which in its outward floating run has had its submerged side properly cooked, is turned half over and redeposited upon the fat to float with its other side down and submerged below its surface, so that upon its return run said other side is fried, both sides being thus cooked before its final delivery.

The forward and return course of the dough strip is of essential advantage not only in providing a simple means for turning it half over, but also for reversing its travel direction, so that the tank need only be half as long as would be necessary if the course of travel of the strip were straight away from its entrance at one end of the tank to its delivery at the other end, since the cooking of each side would require equal lengths of travel.

Any suitable driving means may be employed. I have here illustrated, somewhat diagrammatically, by way of example, a motor 14 with worm 15, engaging a worm wheel 16 upon the shaft of the feed screw 4 in the throat of the hopper 3. From said shaft a pair of spur gears 17 drive a countershaft 18, which carries at its outer end a bevel pinion 19 meshing with a gear 20 on the shaft of the reversing roll 9. A crossed belt 21 drives the roll 11. The associated rolls 8 and 12 may be driven by friction. A pair of spiral gears 22 drive the shaft 23 of the discharge conveyer 13 at the proper relative speed.

A brief resumé of the operation may be of advantage. The dough in the hopper 3 is fed by the screw 4 through the spout 5 and emerges from the tip 6 as a continuous strip 7. The tip of the spout is positioned to lay the dough-strip down upon the surface of the liquefied fat 2 in the tank 1, and as the specific gravity of the dough is less than that of the fat, the strip 7 floats upon the liquid and advances thereon a predetermined distance sufficient to insure the cooking of its submerged side. Near the other end of the tank the strip encounters the system of rotating rolls, by which it is lifted out of the fat, turned half over, and its travel direction reversed, being at the same time shifted over to one side, in order to avoid interference of its reversed course with its outward course. By this roll-system the turned over strip is redeposited upon the surface of the fat, and during its return travel to the first end of the tank, it has its other side cooked; and thus, fully cooked on both sides, it is delivered to the travelling conveyer belt 13 by which it is carried to the cutter.

I claim:—

1. A dough cooking machine comprising a tank for containing a cooking medium; means for feeding dough in a continuous strip to the medium in the tank; means for imparting continuous travel to the strip; and means for turning said strip half over during its travel.

2. A dough cooking machine comprising a tank for containing a cooking medium; means for feeding dough in a continuous strip to the medium in the tank; means for imparting continuous travel to the strip; and means for turning said strip half over during its travel and reversing its travel direction.

3. A dough cooking machine comprising a tank for containing a cooking medium; means for feeding dough in a continuous strip to the medium in the tank; means for imparting continuous travel to the strip; and means approximately midway of its travel for turning said strip half over.

4. A dough cooking machine comprising a tank for containing a cooking liquid; means for feeding dough in a continuous strip to the surface of the liquid; means for imparting continuous travel to said strip floatingly upon the liquid surface; and means for turning said strip half over at a predetermined point in its travel.

5. A dough cooking machine comprising a tank for containing a cooking liquid; means for feeding dough in a continuous strip to the surface of the liquid; means for imparting continuous travel to said strip floatingly upon the liquid surface; and means for turning said strip half over at a predetermined point in its travel consisting of a rotatable roll about which the strip passes.

6. A dough cooking machine comprising a tank for containing a cooking liquid; means for feeding dough in a continuous strip to the surface of the liquid; means for imparting continuous travel to said strip floatingly upon the liquid surface; and means for turning said strip half over at a predetermined point in its travel and reversing its travel direction.

7. A dough cooking machine comprising a tank for containing a cooking liquid; means for feeding dough in a continuous strip to the surface of the liquid; means for imparting continuous travel to said strip floatingly upon the liquid surface; and means for turning said strip half over at a predetermined point in its travel and reversing its travel direction consisting of a system of rotatable rolls adjacent the outer end of the tank.

8. A dough cooking machine comprising a tank for containing a cooking liquid; means for feeding dough in a continuous strip to the surface of the liquid; means for imparting continuous travel to said strip floatingly upon the liquid surface; means for turning said strip half over at a predetermined point in its travel and reversing its travel direction consisting of a system of rotatable rolls adjacent the outer end of the tank; and switching means associated with said roll system for shifting the strip to lay its reversed course to one side of its outward course.

9. A dough cooking machine comprising a tank for containing a cooking liquid; a hopper for containing the dough; a feed screw in the hopper; a spout for reducing the dough to a continuous strip and depositing said strip upon the surface of the cooking liquid at one end of the tank; a system of rotatable rolls at the other end of the tank adapted to impart continuous travel to said strip, turning it half over and reversing its travel direction; switching means associated with said roll system for shifting the strip to lay its reversed course to one side of its outward course; and a traveling conveyer at the feed end of the tank to receive the discharging cooked strip.

In testimony whereof I have signed my name to this specification.

JOHN KRUTTSCHNITT.